No. 761,195. PATENTED MAY 31, 1904.
R. BOSSHARD.
FLEA TRAP.
APPLICATION FILED APR. 11, 1903.
NO MODEL.
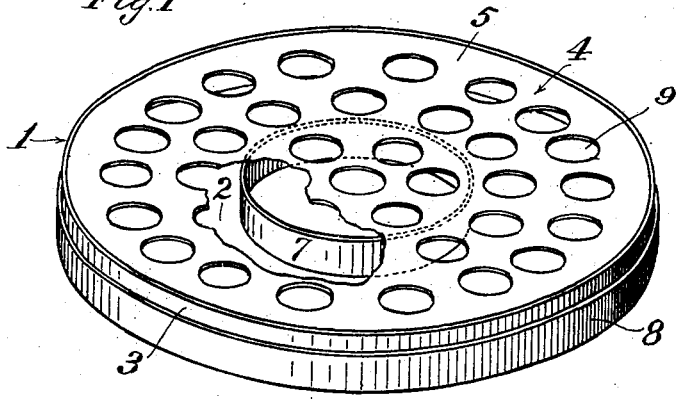
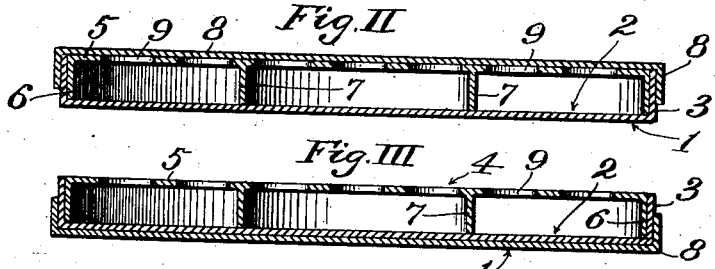
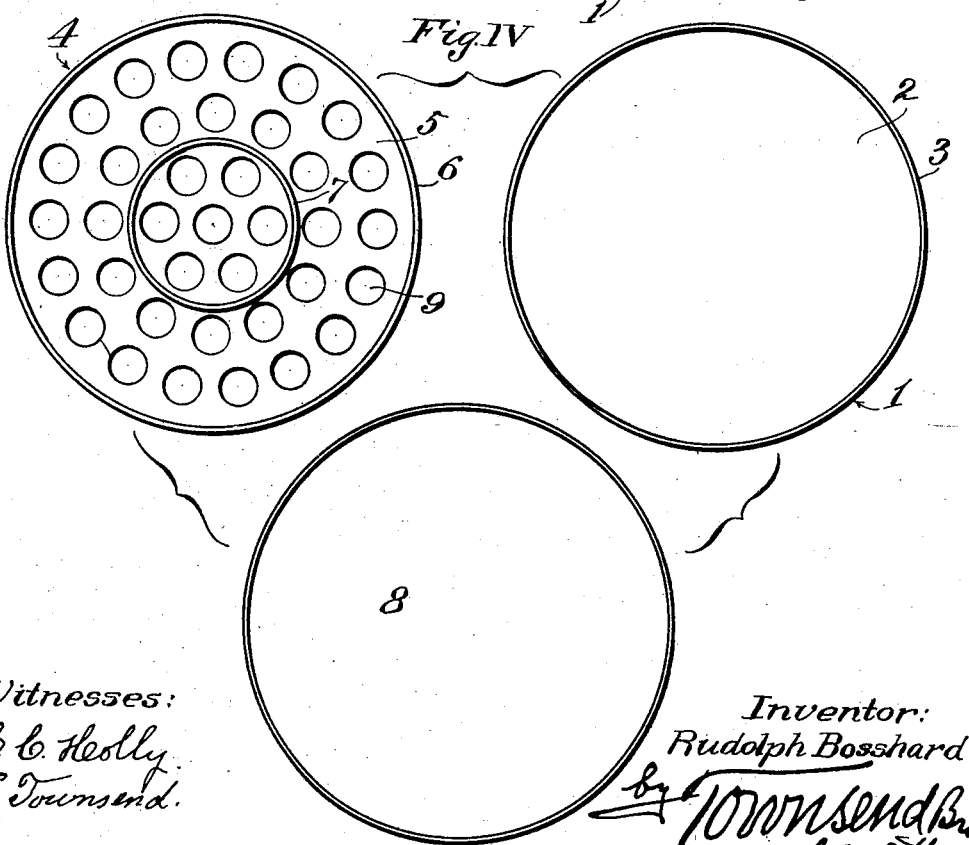
Witnesses:
C. C. Heolly
S. Townsend.
Inventor:
Rudolph Bosshard
by Townsend Bro
his attys.

No. 761,195. Patented May 31, 1904.

UNITED STATES PATENT OFFICE.

RUDOLPH BOSSHARD, OF LOS ANGELES, CALIFORNIA.

FLEA-TRAP.

SPECIFICATION forming part of Letters Patent No. 761,195, dated May 31, 1904.

Application filed April 11, 1903. Serial No. 152,127. (No model.)

*To all whom it may concern:*

Be it known that I, RUDOLPH BOSSHARD, a citizen of the United States, residing at Los Angeles, in the county of Los Angeles and State of California, have invented a new and useful Flea-Trap, of which the following is a specification.

This invention may be applicable for catching various insects, and I do not propose to limit it in its use; but it is more particularly adapted to catching fleas.

An object of my invention is to provide a trap by means of which fleas can be readily caught either by directly bringing the trap into position where the flea jumps or by leaving the trap in a place infested by fleas, so that the fleas may accidentally come thereupon and be entrapped.

The principle of the invention is that I provide a member having a sticky surface and a foraminous guard therefor which will prevent the bedclothing or the apparel of a person from coming into contact with the sticky surface, but will allow the flea free access to said surface. Desirably I provide two plates with interlocking-rim walls, which hold the plates at a distance apart, one of said plates being foraminous and the other furnished with a sticky surface in the interspace between the plates. The foraminous guard is provided with holes or perforations large enough and sufficient in number to allow the flea to have free and uninterrupted access to the sticky surface when it lands within the boundaries of the trap.

The accompanying drawings illustrate the invention in the form which I at present deem most desirable.

Figure I is a perspective view of the trap ready for use, a portion being broken away for clearness of illustration. Fig. II is a vertical mid-section of the trap in closed form for storage and shipment. Fig. III is a like section of the trap ready to be placed in a bed, on a couch, or within one's clothing to catch fleas which may be there. Fig. IV is a view of the three separable members of the trap.

1 is a member in the form of a thin flat receptacle, having inside it a sticky surface 2. 3 is a low rim wall for the receptacle.

4 is a foraminous guard for the sticky surface, which is desirably formed of a flat portion 5, having a low wall 6 and a low brace 7 of equal height with the wall. The wall 6 of the guard is desirably constructed to fit inside of the rim-wall 3, so that when the guard is inserted into the receptacle the appliance thus formed will be a thin flat hollow disk, one side wall of which is perforated and the inside of the other wall is covered with a sticky substance, and an open space is provided between the sticky surface and the foraminous wall of said disk. 8 is a cover adapted to fit upon either of said disks—that is to say, it is interchangeable from one to the other side, so that when placed over the foraminated side a thin closed box is formed, and when it is desirable to use the trap this cover may be removed from the foraminated side and applied to the closed side of the disk, thus strengthening the disk, so that when it is placed in the bed it is not liable to be mashed out of form, as it otherwise might be by the occupant of the bed.

In practical use the trap may be placed at any desired place in a bed or anywhere else where the fleas are liable to be. In case a flea chances to enter the receptacle through any of the holes 9 in the guard he will land upon the sticky surface, and the same will prevent his escape. In case of fleas inside the clothing the trap may be inserted to the place where the flea is manifesting himself, and the flea thus disturbed is very apt to jump through the foraminated guard and light in the sticky substance.

The sticky substance may be of any character which will serve the purpose, and I do not limit myself to the particular character of the stuff of which said surface is to be formed. The ordinary sticky fly-paper may be used to form the floor of the receptacle; but I prefer to apply the sticky substance directly to the floor of the receptacle after such device has been formed and before the guard is placed in position.

The perimeter of the receptacle may be of any desired form. I at present deem a circular form preferable. I do not limit the invention to the exact construction shown.

Having described my invention, what I claim, and desire to secure by Letters Patent of the United States, is—

1. An insect-trap comprising a thin flat receptacle, a sticky substance on the floor thereof, a foraminous guard over said sticky substance with an open space between said substance and the top of the guard, and a cover adapted to cover the receptacle and being interchangeable from the top to the bottom of the receptacle.

2. A receptacle, a foraminous guard above the floor thereof, an internal brace between the floor and guard and a sticky substance on the floor.

In testimony whereof I have signed my name to this specification, in the presence of two subscribing witnesses, at Los Angeles, in the county of Los Angeles and State of California, this 2d day of April, 1903.

RUDOLPH BOSSHARD.

Witnesses:
JAMES R. TOWNSEND.
JULIA TOWNSEND.